(12) United States Patent
Inoue et al.

(10) Patent No.: US 6,634,476 B2
(45) Date of Patent: Oct. 21, 2003

(54) MAGNET TYPE FAN CLUTCH APPARATUS

(75) Inventors: Hiroshi Inoue, Numazu (JP); Kazunori Takikawa, Numazu (JP); Shoichiro Usui, Sendai (JP)

(73) Assignee: Usui Kokusai Sangyo Kaisha, Limited (JP)

( * ) Notice: Subject to any disclaimer, the term of this patent is extended or adjusted under 35 U.S.C. 154(b) by 0 days.

(21) Appl. No.: 09/977,764

(22) Filed: Oct. 15, 2001

(65) Prior Publication Data

US 2002/0046915 A1 Apr. 25, 2002

(30) Foreign Application Priority Data

Oct. 20, 2000 (JP) ......................................... 2000-320764

(51) Int. Cl.$^7$ .......................... F16D 27/01; F16D 27/112
(52) U.S. Cl. .............. 192/48.2; 192/84.31; 192/84.961; 192/113.23
(58) Field of Search .......................... 192/48.2, 113.23, 192/84.3, 84.31, 84.961; 464/29; 310/103, 105, 85, 88

(56) References Cited

U.S. PATENT DOCUMENTS

| | | | |
|---|---|---|---|
| 1,962,659 A | * 6/1934 | Kautz | ......................... 310/103 |
| 2,303,638 A | * 12/1942 | Helin | ......................... 310/105 |
| 2,519,449 A | * 8/1950 | Findley | ..................... 192/21.5 |
| 2,769,932 A | * 11/1956 | Zozulin et al. | ............. 310/105 |
| 2,879,755 A | 3/1959 | Weir | |
| 2,988,188 A | 6/1961 | Tauschek | |
| 3,059,745 A | 10/1962 | Tauschek | |
| 3,198,975 A | * 8/1965 | Fisher | ......................... 310/105 |
| 3,217,849 A | 11/1965 | Weir | |
| 3,259,221 A | 7/1966 | Godfrey | |
| 3,272,188 A | 9/1966 | Sabat | |
| 3,430,743 A | 3/1969 | Fujita et al. | |
| 3,458,122 A | * 7/1969 | Andriussi et al. | ........ 416/170 R |
| 3,463,282 A | 8/1969 | Fujita et al. | |
| 3,627,445 A | * 12/1971 | Andriussi et al. | ......... 416/90 R |
| 3,642,105 A | 2/1972 | Kikuchi | |
| 3,727,735 A | 4/1973 | La Flame | |
| 3,840,101 A | 10/1974 | Peter et al. | |
| 3,856,122 A | 12/1974 | Leichliter | |
| 3,893,555 A | 7/1975 | Elmer | |
| 3,964,582 A | 6/1976 | Mitchell | |
| 4,238,016 A | 12/1980 | Yoshida et al. | |
| 4,281,750 A | 8/1981 | Clancey | |

(List continued on next page.)

FOREIGN PATENT DOCUMENTS

| | | |
|---|---|---|
| EP | 1002940 A2 * | 5/2000 |
| JP | 54-25581 B2 | 8/1979 |
| JP | 55-76226 A | 6/1980 |
| JP | 57-1829 A | 1/1982 |
| JP | 57-167533 A | 10/1982 |
| JP | 57-179431 A | 11/1982 |
| JP | 59-27452 B2 | 7/1984 |
| JP | 62-124330 A | 6/1987 |
| JP | 62-194038 A | 8/1987 |
| JP | 63-182332 U | 11/1988 |

Primary Examiner—Richard M. Lorence
(74) Attorney, Agent, or Firm—Anthony J. Casella; Gerald E. Hespos

(57) ABSTRACT

A magnet type fan clutch apparatus is formed of an electromagnetic clutch mounted on one driving shaft, and a magnet coupling operatively connected to the electromagnetic clutch. The magnetic coupling includes a permanent magnet rotary body to which a fan is fixed, and a disc having a conductor or a hysteresis member opposed to the permanent magnet rotary body with a narrow clearance left therebetween; and formed so that the permanent magnet rotary body and disc are rotated together or relatively owing to an attraction working between the permanent magnet and conductor. The magnetic coupling is formed so as to be ON/OFF controlled by the electromagnetic clutch, and a seal structure is provided between the disc and permanent magnet rotary body.

9 Claims, 15 Drawing Sheets

U.S. PATENT DOCUMENTS

| | | |
|---|---|---|
| 4,403,684 A | 9/1983 | Haeck |
| 4,505,367 A | 3/1985 | Martin |
| 4,629,046 A | 12/1986 | Martin |
| 4,665,694 A | 5/1987 | Brunken |
| 4,667,791 A | 5/1987 | Martin et al. |
| 4,685,549 A | 8/1987 | Brunken et al. |
| 4,699,258 A | 10/1987 | Johnston et al. |
| 4,796,571 A | 1/1989 | Ono et al. |
| 4,846,331 A | 7/1989 | Ono |
| 4,850,465 A | 7/1989 | Ono |
| 4,903,643 A | 2/1990 | Takikawa et al. |
| 4,903,805 A | 2/1990 | Ono |
| 4,926,992 A * | 5/1990 | Linnig ........................ 192/48.2 |
| 4,930,458 A | 6/1990 | Takikawa et al. |
| 5,004,085 A | 4/1991 | Taureg |
| 5,018,612 A | 5/1991 | Takikawa et al. |
| 5,060,774 A | 10/1991 | Takikawa et al. |
| 5,090,533 A | 2/1992 | Inoue |
| 5,101,949 A | 4/1992 | Takikawa et al. |
| 5,109,965 A | 5/1992 | Inoue |
| 5,119,920 A | 6/1992 | Inoue |
| 5,125,491 A | 6/1992 | Takikawa et al. |
| 5,139,125 A | 8/1992 | Takikawa et al. |
| 5,232,074 A | 8/1993 | Watanabe |
| 5,452,782 A | 9/1995 | Inoue |
| 5,501,183 A | 3/1996 | Takayama |
| 5,575,368 A | 11/1996 | Kikuchi et al. |
| 5,586,636 A * | 12/1996 | Linnig ........................ 192/48.2 |
| 5,636,719 A * | 6/1997 | Davis et al. ............... 192/18 A |
| 5,794,749 A | 8/1998 | Ryuu |
| 5,881,857 A | 3/1999 | Ryuu |
| 6,013,003 A * | 1/2000 | Boffelli et al. ............... 475/149 |
| 6,125,981 A | 10/2000 | Ito et al. |
| 6,247,567 B1 | 6/2001 | Watanabe |
| 2001/0017249 A1 * | 8/2001 | Boffelli et al. ............. 192/48.1 |
| 2001/0017250 A1 * | 8/2001 | Boffelli et al. ............. 192/48.2 |

* cited by examiner

Fig. 16
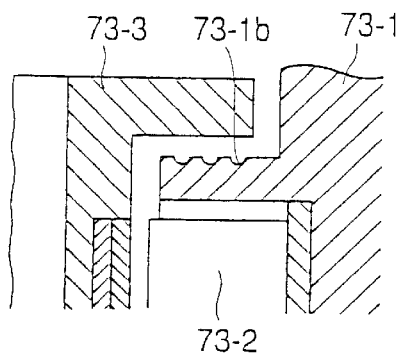
Fig. 17 (a)
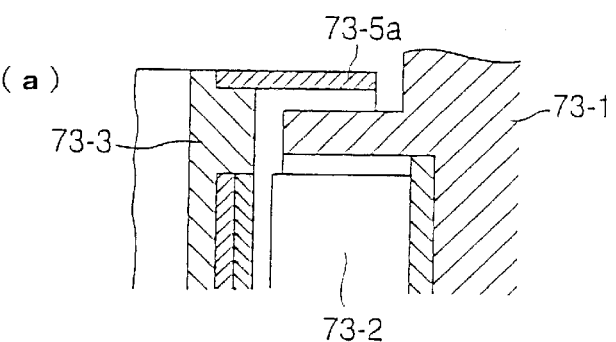
Fig. 17 (b)
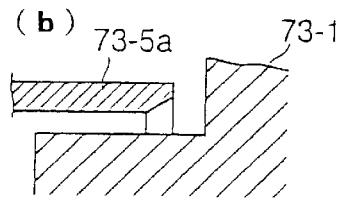
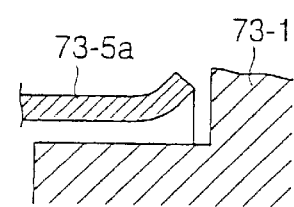
Fig. 17 (c)
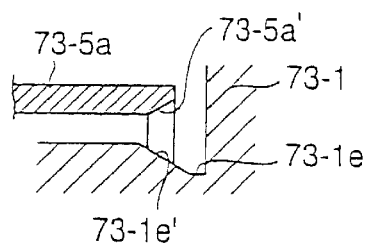
Fig. 17 (d)

MAGNET TYPE FAN CLUTCH APPARATUS

BACKGROUND OF THE INVENTION

1. Field of the Invention

This invention relates to a magnet type fan clutch apparatus adapted to control the rotation of a cooling fan applied mainly to a vehicular internal combustion engine, operable with low noise and at a low fuel consumption and receiving a small shock during an initial period of the rotation thereof.

2. Description of the Related Art

The fan clutches for controlling the rotation of a cooling fan applied to a vehicular internal combustion engine include a liquid fan clutch, a hydraulically driven type fan clutch and the like. A liquid clutch is generally of the type in which the driving torque of a driving disc is transmitted to a case by an oil supplied to a torque transmission chamber. Concerning the construction of such a type of liquid clutch, a coupling apparatus (liquid clutch) is known (refer to Japanese Patent Publication No. 21048/1988) which is formed by, for example, dividing the interior of a sealed case into a torque transmission chamber and an oil reservation chamber by a partition, and providing a driving disc in the torque transmission chamber so that the driving disc can be rotated freely by the driving of a driving part, in which liquid clutch an oil in the oil reservation chamber is supplied from an outflow regulating hole formed in the partition into the torque transmission chamber with the oil the torque transmission chamber returned to the oil reservation chamber through a circulating passage. According to this type of liquid clutch, the driving torque of the driving disc is transmitted to the case by the oil supplied from the oil reservation chamber to the torque transmission chamber, and a fan fixed to the case is rotated, the cooling of a radiator of, for example, an automobile engine being thereby carried out. This type of liquid clutch is adapted to detect an atmospheric temperature by a bimetal, and increase the degree of opening of the outflow regulating hole when this temperature increases, to increase the quantity of the oil in the torque transmission chamber, a rotational frequency of the case, and a cooling effect by rotating the fan at a high speed.

However, the above-mentioned liquid fan clutch and hydraulically driven type fan clutch have problems which will be described below.

Namely, when an engine is restarted with a large quantity of oil existing in a torque transmission chamber of a liquid fan clutch, or when an engine is suddenly accelerated during the travel of a vehicle, a sudden increase in the rotational frequency of a driven case (cooling fan) occurs, though it continues for a short period of time, due to the oil existing in a large quantity in the torque transmission chamber, following up the acceleration of a disc on the driving side. This phenomenon is generally called a phenomenon of "accompanied rotation", which causes the noise of a fan and unpleasant sensation due to the noise to occur, and fuel consumption to lower.

The conspicuousness of the phenomenon of "accompanied rotation" in a related art liquid fan clutch occurring during the restarting of the engine increases in proportion to the quantity of the oil in the torque transmission chamber. As a method of solving this problem, for example, Japanese Patent Publication No. 21048/1988 proposes a liquid fan clutch formed so that an oil flowing out from an outflow regulating hole of a partition is once guided to a diametrically opposite side, from which the oil is supplied to the interior of a torque transmission chamber.

In such a structure, the oil does not flow from an oil reservation chamber into the torque transmission chamber when the engine is stopped with the oil substantially not existing in the torque transmission chamber but existing in large quantities in the oil reservation chamber, so that the phenomenon of "accompanied rotation" does not occur. However, this structure proves not effective in restarting an engine after the engine was stopped with a large quantity of oil existing in the torque transmission chamber, and in preventing the occurrence of the "accompanied rotation" when the engine is suddenly accelerated during the travel of the vehicle.

In the case of a hydraulically driven type fan clutch apparatus, a rotational frequency can be controlled to be at an arbitrary level but hydraulic devices, such as an oil reservoir tank, hydraulic pipes, an oil cooler, a relief valve, etc. are needed. Therefore, this fan clutch apparatus requires a large space, and costs much.

SUMMARY OF THE INVENTION

The present invention has been made in view of these circumstances, and provides a magnet type fan clutch apparatus in which the simplification of the construction and the reduction of the cost are attained by uniting a magnet coupling and an electromagnetic clutch with each other.

According to one aspect of the present invention, the magnet type fan clutch apparatus has a combination of a magnet coupling and an electromagnetic clutch with a fan fixed to the magnet coupling.

According to another aspect of the present invention, the magnet type fan clutch apparatus has an electromagnetic clutch formed of a clutch rotor supported on a driving shaft and having an exciting coil supported on an outer part and incorporated in the clutch rotor, and an armature fixed to a disc supported rotatably on the driving shaft via a bearing; and a magnet coupling which has a permanent magnet rotary body supported rotatably on the driving shaft via a bearing and provided at an outer circumference thereof with a fan fixed thereto, and a hysteresis member or a conductor fixed to the disc so that the hysteresis member or a conductor is opposed to the permanent magnet with a narrow clearance left therebetween, and which is formed so that the permanent magnet rotary body and disc are rotated together owing to an attraction working between the permanent magnet and the hysteresis member or conductor, the magnet coupling being ON/OFF controlled by the electromagnetic clutch.

According to still another aspect of the present invention, the magnet type fan clutch apparatus has an electromagnetic clutch formed of a clutch rotor supported on a driving shaft, an exciting coil provided in the interior of the clutch rotor and supported on an outer part, and an armature held longitudinally movably on the portion of a driven side housing supported rotatably on the clutch rotor via a bearing which is on the side of the exciting coil; and a magnet coupling which has a permanent magnet rotary body, to which a fan is fixed, supported rotatably via a bearing on a driven shaft made integral with the driven side housing, and a disc provided with a hysteresis member or a conductor opposed to the permanent magnet rotary body with a narrow clearance left therebetween, and mounted on the driven shaft, and which is formed so that the permanent magnet rotary body and disc are rotated together owing to an attraction working between the permanent magnet and the hysteresis member or conductor, the magnet coupling being ON/OFF controlled by the electromagnetic clutch.

According a further aspect of the present invention, the magnet type fan clutch apparatus has an electromagnetic clutch formed of a clutch rotor supported on a driving shaft, an exciting coil supported on a flange which is supported rotatably on the driving shaft via a bearing and fixed to an outer part, and an armature held longitudinally movably via a bearing on the portion of a driven side cylinder supported rotatably on the driving shaft which is on the side of the exciting coil; and a magnet coupling which is formed of a permanent magnet, to which a fan is fixed, supported rotatably on an outer circumference of the driven side cylinder via a bearing, a hysteresis member or a conductor opposed to the permanent magnet rotary body with a narrow clearance left therebetween, and fixed on an outer circumference of the driven side cylinder, and which is formed so that the permanent magnet rotary body and driven side cylinder are rotated together owing to an attraction working between the permanent magnet and the hysteresis member or conductor, the magnet coupling being ON/OFF controlled by the electromagnetic clutch.

According to another aspect of the present invention, the magnet type fan clutch apparatus has a magnet coupling formed of a permanent magnet rotary body mounted fixedly on a driven shaft the rotation of which is controlled by an electromagnetic clutch, and a fan-carrying disc which has a hysteresis member or a conductor opposed to the permanent magnet rotary body with a narrow clearance left therebetween, and which is supported rotatably on the driven shaft via a bearing; and formed so that the permanent magnet rotary body and fan-carrying disc are rotated together owing to an attraction working between the permanent magnet on the permanent magnet rotary body and the hysteresis member or conductor, the magnet coupling being ON/OFF controlled by the electromagnetic clutch.

According to still another aspect of the present invention, the magnet type fan clutch apparatus has an electromagnetic clutch formed of a clutch rotor supported rotatably on a non-rotatably fixed shaft via a bearing, an exciting coil mounted fixedly on the fixed shaft and provided in the clutch rotor, and an armature longitudinally movably held on a rear surface, i.e. the surface of the permanent magnet rotary body supported rotatably via a bearing on the fixed shaft which is on the side of the exciting coil; and a magnet coupling which is formed of a permanent magnet rotary body supported rotatably on the fixed shaft via a bearing, and a disc, to which a fan is fixed, provided with a hysteresis member or a conductor opposed to the permanent magnet rotary body with a narrow clearance left therebetween, and which is formed so that the permanent magnet rotary body and disc are rotated together owing to an attraction working between the permanent magnet rotary body and the hysteresis member or conductor, the magnet coupling being ON/OFF controlled by the electromagnetic clutch.

The electromagnetic clutches in the above-described magnet type fan clutch apparatuses are formed so that the electromagnetic clutches are ON/OFF controlled in accordance with a cooling water temperature, a degree of opening of a throttle, an engine speed and an operation of an air-conditioner switch, and so that the rotation of the magnet coupling, i.e. the rotation of the fan can be controlled by the ON/OFF controlling of the electromagnetic clutch. In the magnet type fan clutch apparatus according to the present invention, thermal ferrite is substituted for the permanent magnet, and an eddy current material (conductor) or iron or ferrite stainless steel for the hysteresis member. As a rotary driving power source, a system for driving the clutch rotor by an engine directly or via a pulley or a gear; or a special motor, etc. provided separately from an engine can be used.

When the exciting coil of the electromagnetic clutch in the above-described magnet type fan clutch apparatuses is turned on, the armature is attracted to the clutch rotor, so that the clutch rotor and armature, and disc or driven side housing or cylinder are rotated together. Consequently, the fan is rotated by the magnet coupling. Since the magnet coupling transmits torque by a magnetic force of the permanent magnet during this time, the magnet coupling slips and starts a cushioning action. Therefore, when the electromagnetic clutch is turned on, a load is low, and the noise of the fan can be reduced remarkably. When the electromagnetic clutch is turned off, the armature leaves the clutch rotor, so that a rotational speed of the magnet coupling decreases greatly or the magnet coupling stops. Consequently, a rotational speed of the fan decreases greatly, or the fan stops.

When the electromagnetic clutch is turned on in the magnet type fan clutch apparatus of a system in which the rotation of a driving shaft is controlled directly by an electromagnetic clutch, the driving shaft is rotated, so that a fan is rotated by a magnet coupling formed of a permanent magnet rotary body mounted fixedly on this driving shaft and a fan-carrying disc supported rotatably on the same shaft. During this time, the magnet coupling also starts a cushioning action in the same manner. Therefore, when the electromagnetic clutch is turned on, a load is low, and the noise of the fan can be reduced. When the electromagnetic clutch is turned off, a rotational speed of the driving shaft decreases greatly, or the driving shaft stops. Consequently, a rotational speed of the fan decreases greatly, or the fan stops.

Thus, according to the present invention, the rotation of the fan can be controlled by turning on and off the electromagnetic clutch. Since the electromagnetic clutch is ON/OFF controlled in accordance with a cooling water temperature, a degree of opening of a throttle, an engine speed and an operation of an air-conditioner switch, the rotation of the fan can be controlled accurately and stably.

In the above-described magnet type fan clutch apparatus according to the present invention, so-called magnetic energy is utilized. Therefore, especially in, the disc-carrying magnet type fan clutch apparatuses except the magnet type fan clutch apparatus using such a cylinder type magnet coupling as in the fourth-mentioned invention, the entry of the ambient dust (dust, metal powder, etc.), water, etc. into a very narrow clearance between the permanent magnet and a conductor causes a function disorder to occur in some cases. Therefore, in the magnet type fan clutch apparatus, taking measures to prevent the entry of dust (powdered dust, metal powder, etc.), water, etc. into a very narrow clearance between the permanent magnet and conductor is needed.

As such measures, the present invention is provided with structures described in 7th to 12th inventions.

Namely, the magnet type fan clutch apparatus according to a 7th invention is provided with a seal structure between the circumferential portion of such a disc as mentioned above which is on the outer side of a conductor and the circumferential portion of a permanent magnet rotary body which is on the outer side of a permanent magnet.

The magnet type fan clutch apparatus according to an 8th invention is provided with a labyrinth seal type structure as the seal structure.

The magnet type fan clutch apparatus according to a 9th invention is provided with a spiral type seal structure as the labyrinth seal type structure.

The magnet type fan clutch apparatus according to a 10th invention is provided with a ventilation mechanism between such a disc as mentioned above and a permanent magnet rotary body.

The magnet type fan clutch apparatus according to an 11th invention is provided with a ventilation mechanism made by forming guide grooves, which are capable of obtaining an effect identical with that of guide vanes of a pump, in the opposed surfaces of a conductor on such a disc as mentioned above and a permanent magnet rotary body.

The magnet type fan clutch apparatus according to a 12th invention is provided on an outer circumferential end portion of the surface of such a disc as mentioned above which is opposed to a permanent magnet rotary body with ventilation blades and/or on an inner side of a conductor with ventilation vanes, over the whole circumferences thereof so that the blades and/or vanes project incliningly or radially.

The magnet type fan clutch apparatus according to a 13th invention is provided on the inner side of a permanent magnet of a permanent magnet rotary body which is opposed to a disc with ventilation vanes and/or on an outer circumferential side of the permanent magnet with ventilation blades so that the vanes and/or blades project radially.

A combination of the permanent magnet of the magnet coupling and the hysteresis member or conductor in the magnet type fan clutch apparatuses of the first to 12th inventions can be formed of an eddy current member provided on a front surface of an iron plate or hysteresis member and a permanent magnet (14th invention).

BRIEF DESCRIPTION OF THE DRAWINGS

FIG. 16 is an enlarged sectional view of a principal portion of a ninth example of the seal structure in the same apparatuses;

FIG. 17 is an enlarged sectional view of a principal portion of a 10th example of the seal structure in the same apparatuses, wherein:

FIG. 17A shows a seal structure formed by fixing a cylindrical member of a constant thickness to an outer circumferential edge portion of a disc;

FIG. 17B shows a seal structure formed by providing such a cylindrical member as mentioned above so that the cylindrical member has a reduced thickness at an opened end portion thereof;

FIG. 17C shows a seal structure formed by providing such a cylindrical member as mentioned above, so as to be bent outward at an opened end portion thereof; and FIG. 17D shows a seal structure formed so that such a cylindrical member as mentioned above has a trumpet-shaped opened end portion with an annular groove 73-1e formed in a permanent magnet rotary body;

FIG. 24 is a schematic sectional view showing examples of the combination of a permanent magnet of the coupling and a hysteresis member or a conductor which corresponds to the similar combination in the 13th present invention, wherein:

FIG. 24A shows an example of the combination of a permanent magnet and a hysteresis member;

FIG. 24B shows an example of the combination of a permanent magnet and a hysteresis member on a front surface of which an eddy current member is provided; and FIG. 24C shows an example of the combination of a permanent magnet and an iron plate on a front surface of which an eddy current member is provided.

DETAILED DESCRIPTION OF PREFERRED EMBODIMENTS

Figure 1:
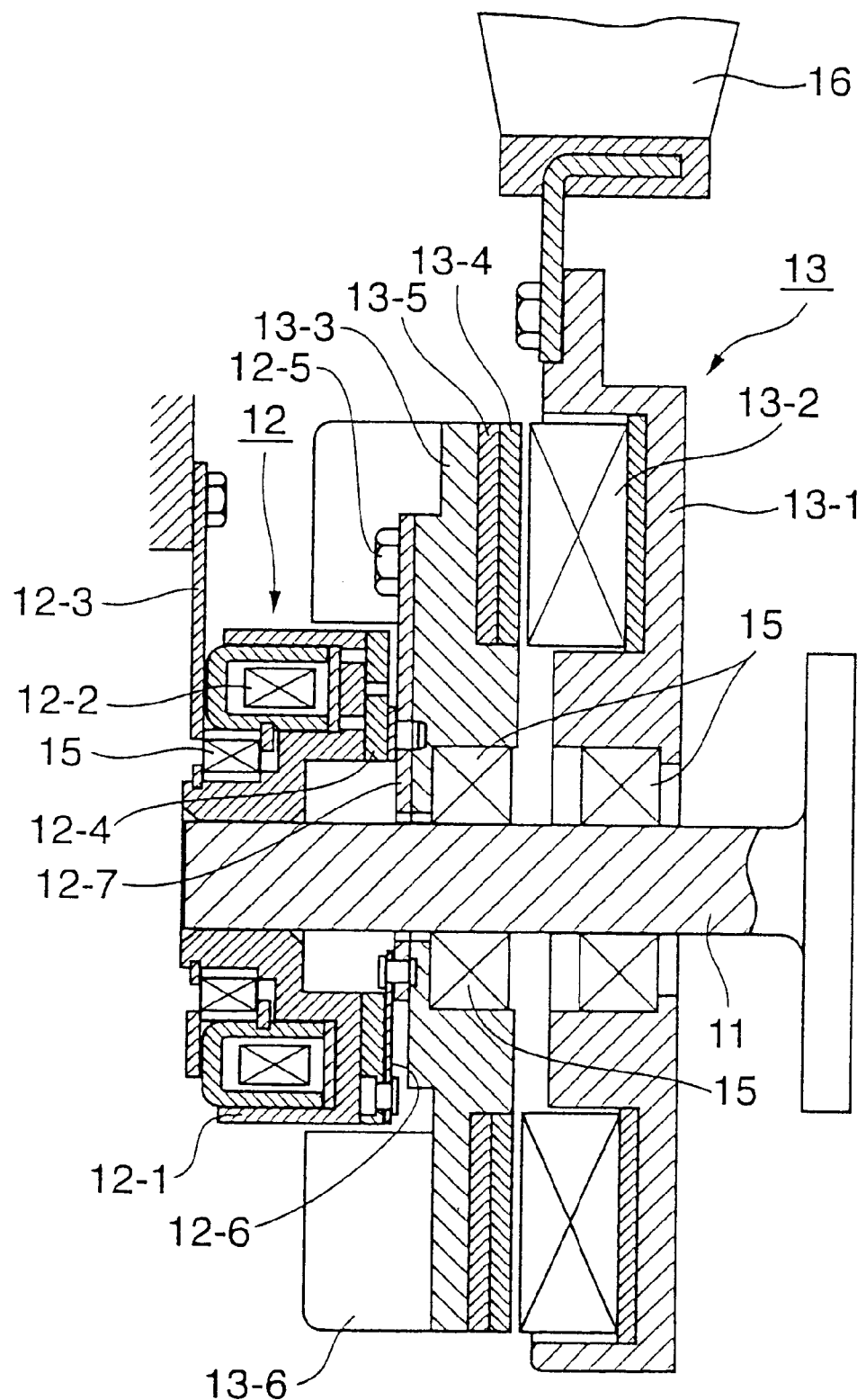
FIG. 1 is a sectioned side elevation showing an embodiment of the magnet type fan clutch apparatuses corresponding to the first and second present inventions.

According to the present invention, reference numerals 11, 21, 31, 41, 71 denote driving shafts, 51 a driven shaft, 61 a fixed shaft, 12, 22, 32, 42, 52, 62, 72 electromagnetic clutches, 13, 23, 33, 43, 53, 63, 73 magnet couplings, 15, 25, 35, 45, 55, 65, 75 bearings, 16, 26, 36, 46, 56, 66, 76 fans, and 34 a driven side housing.

A magnet type fan clutch apparatus shown in FIG. 1 includes an electromagnetic clutch 12 and a magnet coupling 13 which are mounted on one driving shaft 11. The electromagnetic clutch 12 includes a clutch rotor 12-1 supported on an end portion of the driving shaft 11 so as to be united therewith, an exciting coil 12-2 fitted in and rotatable with the clutch rotor 12 via the bearing 15 in the clutch motor 12-1 and fixed to an outer part via a bracket 12-3, and an armature 12-4 held longitudinally movably on the portion of a disc 13-3 supported rotably on the driving shaft 11 via the bearing 15 which is on the side of the exciting coil 12-2. The armature 12-4 is fixed to the clutch rotor 12-1 via a spring 12-6 fixed at one end thereof to a stay 12-7 fitted around the driving shaft 11 and attached at one end portion thereof to the disc 13-3 by a bolt 12-5. The magnet coupling 13 is formed by fixing a fan 16 to a permanent magnet rotary body 13-1 supported rotatably on the driving side portion of the driving shaft 11 which is on the opposite side of the electromagnetic clutch 12 via the bearings 15, and securing a conductor 13-4, which is opposed to a permanent magnet 13-2 attached to the permanent magnet rotary body 13-1 with a narrow clearance left therebetween, to the disc 13-3 via a core 13-5, the permanent magnet 13-2 and conductor 13-4 being thereby rotated together or relatively owing to an attraction of an eddy current working therebetween. A reference numeral 13-6 denotes radiation fins.

When the electromagnetic clutch 12 is turned on with the driving shaft 11 in a rotating state in the magnet type fan clutch apparatus of the construction shown in FIG. 1, the armature 12-4 held on the portion of the disc 13-3 which is on the side of the magnet coupling 13 is attracted to the clutch rotor 12-1, which is rotated with the driving shaft 11, owing to the exciting coil 12-2 provided in the clutch rotor 12-1, so that the clutch rotor 12-1 and armature 12-4 and disc 13-3 are rotated together. When this disc 13-3 is rotated, the permanent magnet rotary body 13-1 starts being rotated owing to an attraction working between the conductor 13-4 attached to the disc 13-3 and the permanent magnet 13-2 of the permanent magnet rotary body 13-1, and the fan 16 also starts being rotated. During this time, the magnet coupling 13 starts a cushioning action. Therefore, a load at the time of starting the energization of the electromagnetic clutch 12 is low, and the noise of the fan can be reduced remarkably. When the electromagnetic clutch 12 is turned off, the armature 12-4 leaves the clutch rotor 12-1 owing to a resilient force of a spring 12-6. This causes a rotational speed of the disc 13-3 to decrease greatly, or the disc 13-3 to stop. Consequently, a rotational speed of the fan 16 decreases greatly, or the fan 16 stops. Namely, the rotation of the fan 16 can be controlled by turning on and off the electromagnetic clutch 12. Since the turning on and off of the electromagnetic clutch 12 can be controlled in accordance with a cooling water temperature, a degree of opening of a throttle, an engine speed, an operation of an air-conditioner switch, etc., the rotation of the fan 16 can be controlled accurately and stably.

Figure 2:
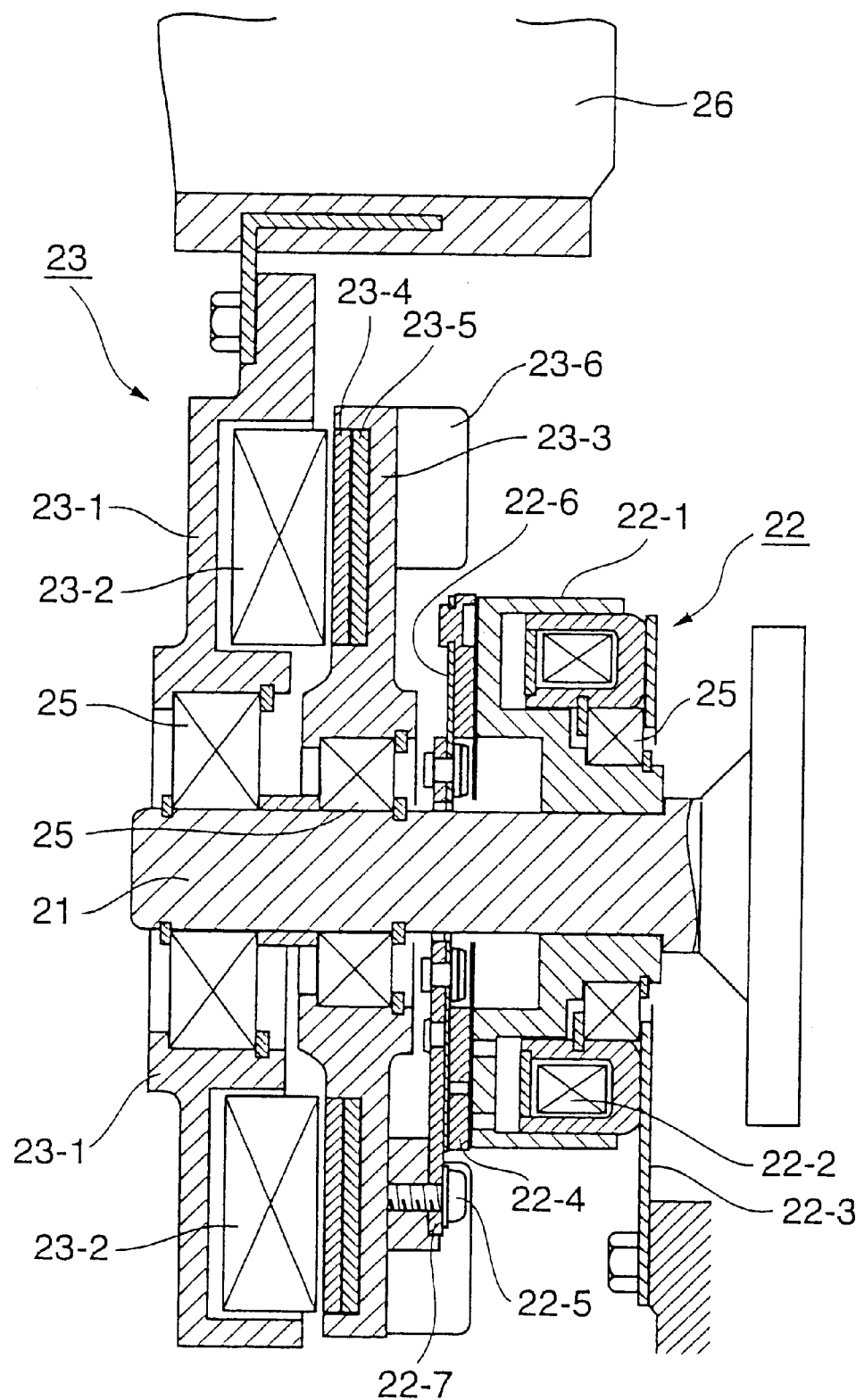
FIG. 2 is a sectioned side elevation showing another embodiment of the magnet type fan clutch apparatus shown in FIG. 1.

The magnet type fan clutch apparatus shown in FIG. 2 is formed by reversing the positions in which the electromagnetic clutch 12 and magnetic coupling 13 employed in the magnet type fan clutch apparatus shown in FIG. 1 are provided. In short, in the apparatus of FIG. 2, an electromagnetic clutch 22 is mounted on the driving side portion of a driving shaft 21, and a magnet coupling 23 on the portion of the driving shaft 21 which is on the opposite side of the driving side portion thereof. The construction of this magnet type fan clutch apparatus is identical with that of the similar apparatus shown in FIG. 1. Namely, the electromagnetic clutch 22 mounted on the driving side portion of the driving shaft 21 is formed of a clutch rotor 22-1 supported on an end portion of the driving shaft 21 so as to be united therewith, an exciting coil 22-2 fitted in the clutch rotor 22-1 via a bearing 25 rotatably therewith and fixed to an outer part via a bracket 22-3, and an armature 22-4 held longitudinally movably on the portion of the disc 23-3 supported rotatably on the driving shaft 21 via the bearing 25 which is on the side of the exciting coil 22-2. The armature 22-4 is fitted around the driving shaft 21, and fixed to the clutch rotor 22-1 via a spring 22-6 fixed at one end portion thereof to a stator 22-7 which is fixed at an outer end portion thereof to the disc 23-3 by a bolt 22-5. The magnet coupling 23 is formed by fixing a fan 26 to the disc 23-3 supported rotatably on the portion of the driving shaft 21 which is on the opposite side of the electromagnetic clutch 22 via the bearing 25, and to the permanent magnet rotary body 23-1 also mounted rotatably on the driving shaft 21 via the bearing 25; and securing a conductor 23-4, which is opposed to the permanent magnet 23-2 attached to the permanent magnet rotaray body 23-1 with a narrow clearance left therebetween, to the disc 23-3 via a core 23-5, the permanent magnet rotary body 23-1 and disc 23-3 being rotated together or relatively owing to an attraction of an eddy current working between the permanent magnet 23-2 and conductor 23-4. A reference numeral 23-6 denotes fins.

When the electromagnetic clutch 22 in the magnet type fan clutch apparatus of the construction shown in FIG. 2 is turned on with the driving shaft 21 in a rotated condition, the armature 22-4 held on the portion of the disc 23-3 which is on the side of the magnet coupling 23 is attracted to the clutch rotor 22-1 owing to the exciting coil 22-2 provided in the clutch rotor 22-1 rotated with the driving shaft 21. Consequently, the clutch rotor 22-1, armature 22-4 and disc 23-3 are rotated together. When this disc 23-3 is rotated, the permanent magnet rotary body 23-1 starts being rotated owing to an attraction working between the conductor 23-4 attached to the disc 23-3 and the permanent magnet 23-2 of the permanent magnet rotary body 23-1, to cause the fan 26 to start being rotated. During this time, the magnet coupling 23 starts a cushioning action. Therefore, a load at the time of starting the energization of the electromagnetic clutch 22 is low, and the noise of the fan can be reduced greatly. When the electromagnetic clutch 22 is turned off, the armature 22-4 leaves the clutch rotor 22-1. Therefore, a rotational speed of the disc 23-3 decreases greatly, or the disc 23-3 stops; and a rotational speed of the fan 26 decreases greatly, or the fan 26 stops. Namely, in the case of this magnet type fan clutch apparatus, the rotation of the fan 26 can also be controlled by turning on and off the electromagnetic clutch 22. Since the turning on and off of the electromagnetic clutch 22 can be controlled in accordance with a cooling water temperature, a degree of opening of a throttle, an engine speed, an operation of an air-conditioner switch, etc., the rotation of the fan can be controlled accurately and stably.

Figure 3:
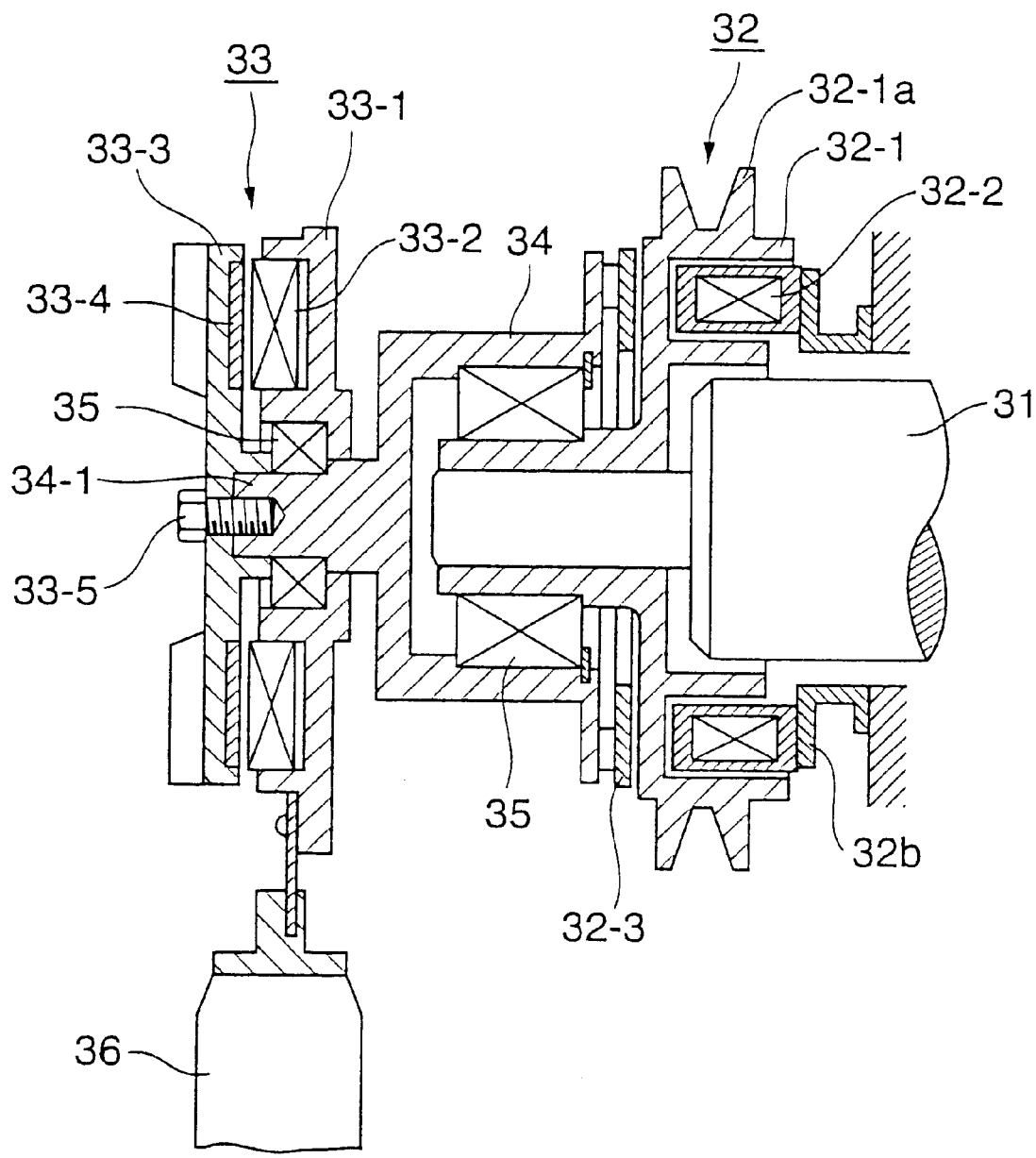
FIG. 3 is a sectioned side elevation showing an embodiment of the magnet type fan clutch apparatuses corresponding to the first and third present inventions.

The magnet type fan clutch apparatus shown in FIG. 3 is formed of an electromagnetic clutch 32 provided on the side of a driving shaft 31, and a magnet coupling 33 provided on the side of a driven shaft. The electromagnetic clutch 32 includes a clutch rotor 32-1 having a pulley 32-1a supported on the driving shaft 31, an exciting coil 32-2 provided in the clutch rotor 32-1 and fixed via a bracket 32b of the driving shaft 31, and an armature 32-3 held longitudinally movably on the portion of a driven side housing 34 supported rotatably on the clutch rotor 32-1 via a bearing 35 which is on the side of the exciting coil 32-2. The magnet coupling 33 is formed by fixing a fan 36 to a permanent magnet rotary body 33-1 supported via a bearing 35 rotatably on a driven shaft 34-1 projecting from the driven side housing 34 coaxially with the driving shaft 31, and securing a disc 33-3 having a conductor or hysteresis member 33-4 opposed to the permanent magnet 33-2, which is attached to the permanent magnet rotary body 33-1, with a narrow clearance left therebetween to an end portion of the driven shaft 34-1 by a bolt 33-5, the permanent magnet rotary body 33-1 and the disc 33-3 having the conductor 33-4 being thereby rotated together or relatively owing to an attraction generated by an eddy current and working between the permanent magnet 33-2 and conductor 33-4.

When the electromagnetic clutch 32 in the magnet type fan clutch apparatus shown in FIG. 3 is turned on with the clutch rotor 32-1 and driving shaft 31 rotated via the pulley 32-1a, the armature 32-3 supported longitudinally movably on the driven side housing 34 is attracted to the clutch rotor 32-1 owing to the excitation coil 32-2, so that the clutch rotor 32-1 and armature 32-3 and driven housing 34 are rotated together. When the driven side housing is rotated, the fan is rotated by the magnet coupling 33 mounted on the driven shaft 34-1 projecting from the driven side housing 34. Namely, when the driven shaft 34-1 is rotated, the disc 33-3 and permanent magnet rotary body 33-1 mounted thereon are rotated owing to an attraction working between the conductor or hysteresis member 33-4 and the permanent magnet 33-2 to cause the fan 26 to the rotated. During this time, the magnet coupling 33 starts a cushioning action. Therefore, a load at the time of starting the energization of the electromagnetic clutch 32 is low, and the noise of the fan can be reduced greatly. When the electromagnetic clutch 32 is turned off, the armature 32-3 leaves the clutch rotor 32-1. Accordingly, a rotational speed of the driven housing 34 decreases greatly, or the driven housing stops; and a rotational speed of the fan 36 decreases greatly or the fan stops.

In the case of this magnet type fan clutch apparatus, the rotation of the fan 36 can also be controlled by turning on and off the electromagnetic clutch 32. Since the turning on and off of the electromagnetic clutch 32 is controlled in accordance with a cooling water temperature, a degree of opening of a throttle, an engine speed and an operation of an air-conditioner switch, the rotation of the fan can be controlled accurately and stably.

Figure 4:
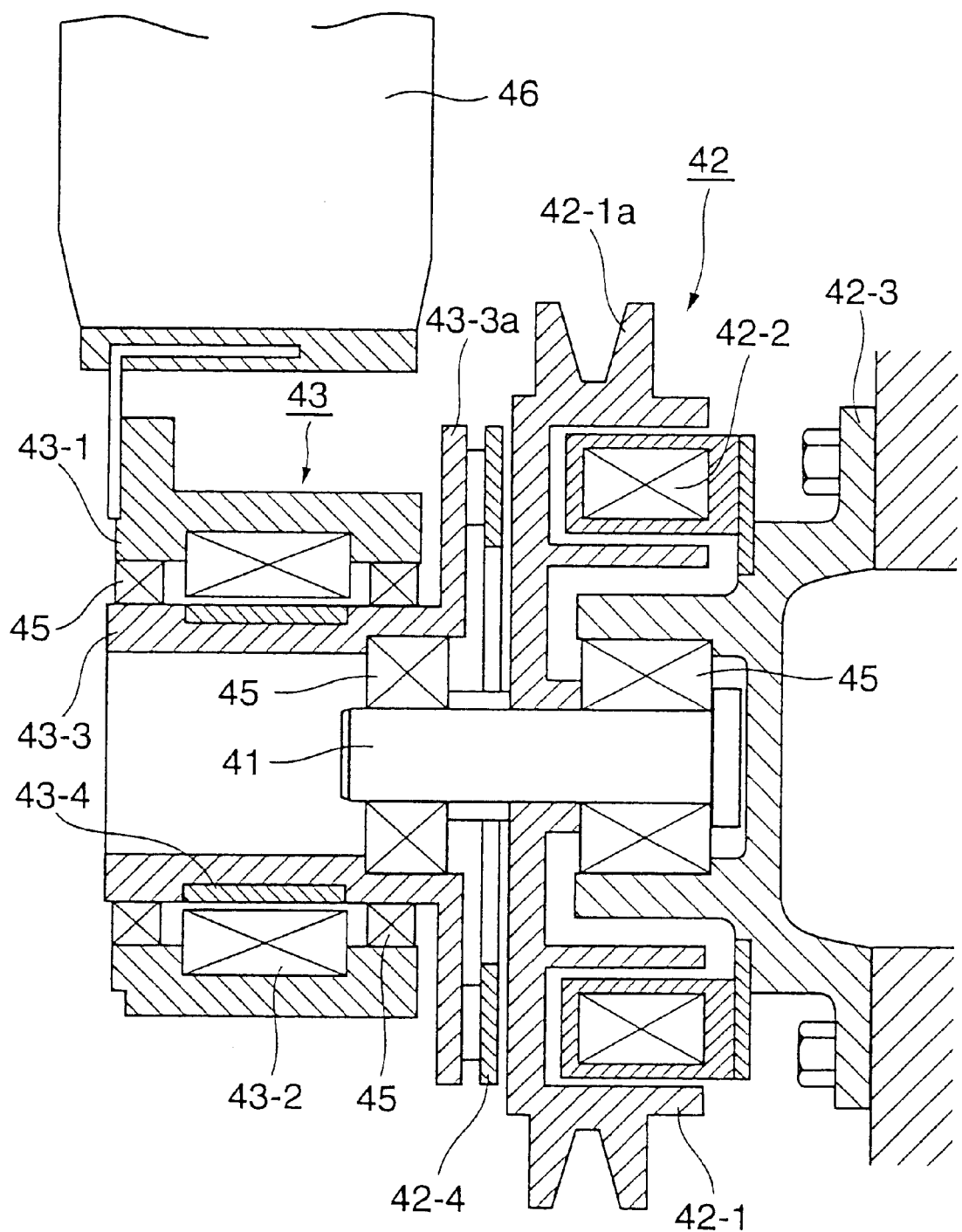
FIG. 4 is a sectioned side elevation showing an embodiment of the magnet type fan clutch apparatuses corresponding to the first and fourth present inventions.

The magnet type fan clutch apparatus shown in FIG. 4 is formed of the same electromagnetic clutch 42 and cylinder type magnet coupling 43 as mentioned above which are mounted on one driving shaft 41. The electromagnetic clutch 42 includes a clutch rotor 42-1 supported on the driving shaft 41 and having a pulley 42-1a, an excitation coil 42-2 provided in the clutch rotor 42-1 and fixed to a flange 42-3 which supports the driving shaft 41 rotatably via a bearing 45, and which is fixed to an outer part, and an armature 42-4 held on a flange 43-3a of a cylinder 43-3, which is supported rotatably on an end portion of the driving shaft 41 via the bearing 45, and which has the flange 43-3a, in such a manner that the armature is opposed to the side of the excitation coil 42-2 and can be moved longitudinally. The magnet coupling 43 is formed by fixing a fan 46 to a permanent magnet rotary body 43-1 supported rotatably via the bearing 45 on an outer circumference of the flanged cylinder 43-3 which is supported rotably on the driving shaft 41 via the bearing 45, and securing a conductor or a hysteresis member 43-4, which is opposed to a permanent magnet 43-2 attached to the permanent magnet rotary body 43-1 with a narrow clearance left therebetween, to an outer circumference of the flanged cylinder 43-3; and formed so that the permanent magnet rotary body 43-1 and flanged cylinder 43-3 are rotated together or relatively owing to an attraction generated by an eddy current and working between the permanent magnet 43-2 and conductor or hysteresis member 43-4.

When the electromagnetic clutch 42 in the magnet type fan clutch apparatus of the construction shown in FIG. 4 is turned on with the clutch rotor 42-1 and driving shaft 41 rotated via the pulley 42-1a, the armature 42-4 supported longitudinally movably on the flanged cylinder 43-3 is attracted to the clutch rotor 42-1 owing to the excitation coil 42-2 provided in the clutch rotor 42-1, so that the clutch rotor 42-1 and armature 42-4 and the flanged cylinder 43-3 are rotated together. When the flanged cylinder 43-3 is rotated, the cylinder and permanent magnet rotary body 43-1 are rotated owing to an attraction working between the conductor or hysteresis member 43-4 and permanent magnet 43-2 to cause the fan 46 to be rotated. During this time, the magnet coupling 43 starts a cushioning action. Therefore, a load at the time of starting the energization of the electromagnetic clutch 42 is low, and the noise of the fan can be reduced greatly. When the electromagnetic clutch 42 is turned off, the armature 42-4 leaves the clutch rotor 42-1. Accordingly, a rotational speed of the flanged cylinder 43-3 decreases greatly, or the flanged cylinder stops; and a rotational speed of the fan 46 decreases greatly, or the fan stops.

In this magnet type fan clutch apparatus, the rotation of the fan 46 can also be controlled by turning on and off the electromagnetic clutch 42. Since the turning on and off of the electromagnetic clutch 42 is controlled in accordance with a cooling water temperature, a degree of opening of a throttle, an engine speed and an operation of an air-conditioner switch, the rotation of the fan can be controlled accurately and stably. Moreover, in the case of this magnet type fan clutch apparatus, the length of the blades of the fan can be set large, and an air quantity can be increased since the diameter of a cylinder-carrying magnet type fan clutch apparatus is smaller than that of a disc-carrying magnet type fan clutch apparatus. The transmission torque can be changed easily by axially sliding the permanent magnet rotary body 43-1 and flanged cylinder 43-3, so that a rotational speed of the fan can be arbitrarily controlled.

Figure 5:
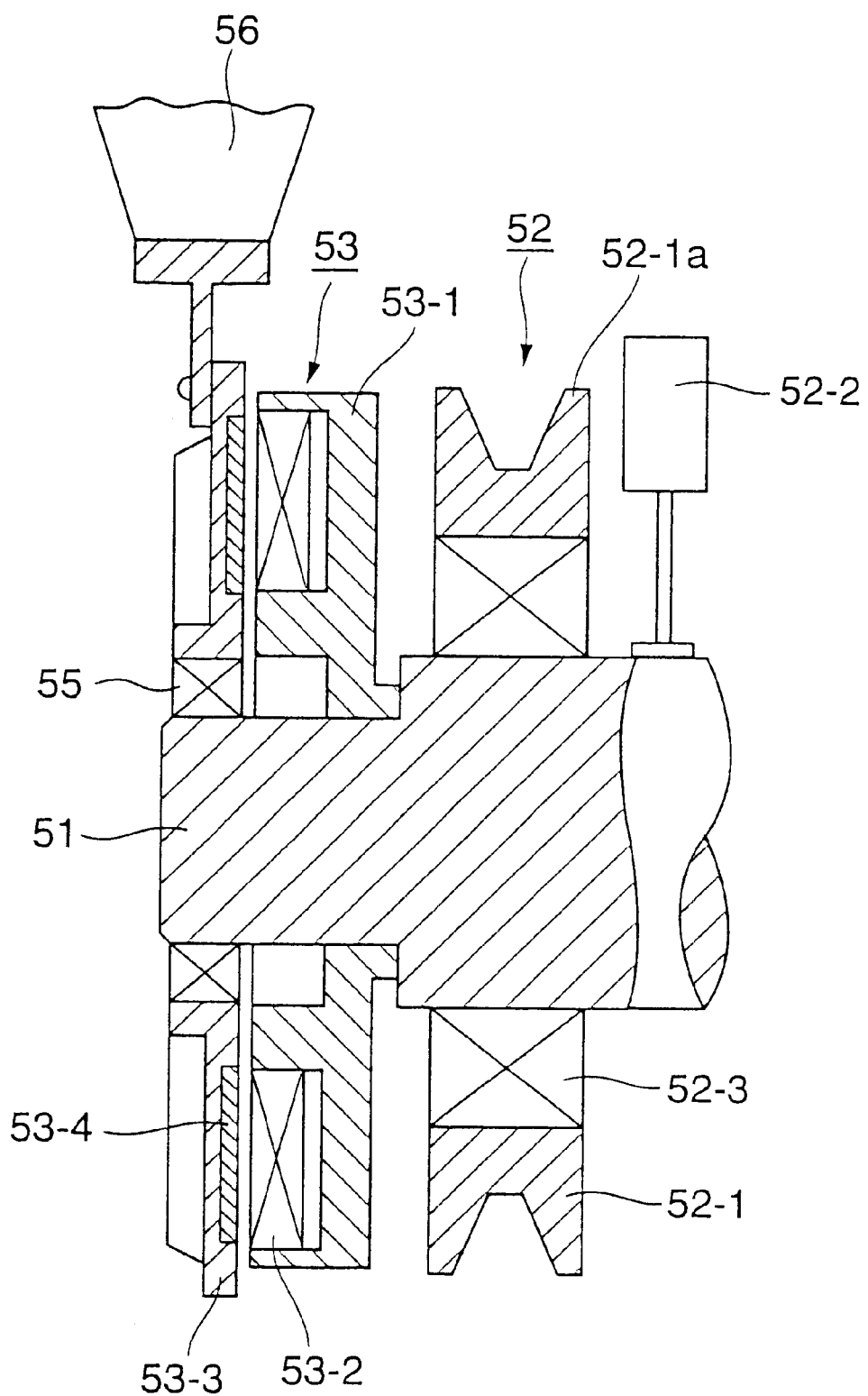
FIG. 5 is a sectioned side elevation showing an embodiment of the magnet type fan clutch apparatuses corresponding to the first and fifth present invention.

The magnet type fan clutch apparatus shown in FIG. 5 is formed by mounting an electromagnetic clutch 52 and a magnet coupling 53 on a driven shaft 51. The electromagnetic clutch 52 is formed of a clutch rotor 52-1 supported on the driven shaft 51 via a rotary mechanism 52-3 and having a pulley 52-1a, and a solenoid type actuator 52-2 adapted to stop a rotation of the driven shaft 51. The magnet coupling 53 is formed of a permanent magnet rotary body 53-1 mounted fixedly on the driven shaft 51, and a fan-carrying disc 53-3 having a conductor or a hysteresis member 53-4 opposed to a permanent magnet 53-2, which is fixed to the permanent magnet rotary body supported rotatably on the driven shaft 51 via a bearing 55, with a narrow clearance left therebetween; and formed so that the permanent magnet rotary body 53-1 and the disc 53-3 having the conductor 53-4 are rotated together or relatively owing to an attraction generated by an eddy current and working between the permanent magnet 53-2 and conductor or hysteresis member 53-4.

When the clutch rotor 52-1 and driven shaft 51 in the magnet type fan clutch apparatus shown in FIG. 5 are rotated via the pulley 52-1a with the solenoid type actuator 52-2 turned off and with the electromagnetic clutch 51 turned on, the permanent magnet rotary body 53-1 fixedly mounted on the driven shaft 51 is rotated, so that the disc 53-3 supported rotatably on the driven shaft via the bearing 55 is rotated owing to an attraction working between the conductor or hysteresis member 53-4 and permanent magnet 53-2 to cause the fan 56 to be rotated. During this time, the magnet coupling 53 starts a cushioning action in the same manner as the previously mentioned magnet coupling. Therefore, a load at the time of starting the energization of the electromagnetic clutch 52 is low, and the noise of the fan can be reduced greatly.

When the rotation of the driven shaft 51 is stopped by turning on the solenoid type actuator 52-2 of the electromagnetic clutch 52, the rotational speed of the permanent magnet rotary body 53-1 decreases greatly, or the permanent magnet rotary body stops; and the rotational speed of the fan 56 decreases greatly, or the fan stops. Accordingly, in this embodiment, the rotation of the fan 56 can also be controlled by turning on and off the electromagnetic clutch 52.

Figure 6:
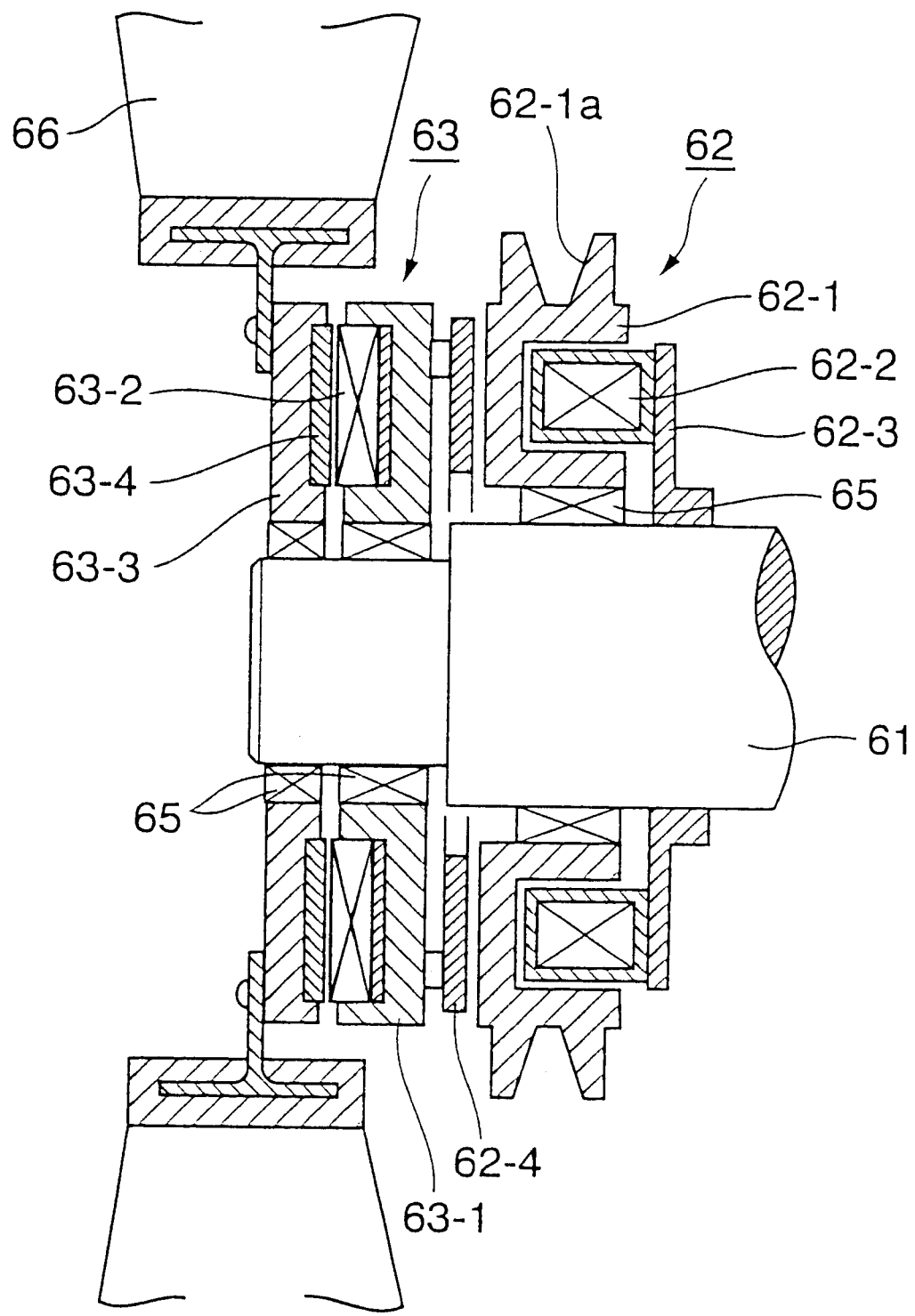
FIG. 6 is a sectioned side elevation showing an embodiment of the magnet type fan clutch apparatuses corresponding to the first and sixth present invention.

The magnet type fan clutch apparatus shown in FIG. 6 is formed by mounting an electromagnetic clutch 62 and a magnet coupling 63 on a non-rotatable fixed shaft 61. The electromagnetic clutch is formed of a clutch rotor 62-1 supported rotatably on the fixed shaft 61 via a bearing 65 and having a pulley 62-1a, an exciting coil 62-2 fitted in this clutch rotor and fixed on the fixed shaft 61 via a stay 62-3, and an armature 62-4 held longitudinally movably on the portion of a permanent magnet rotary body 63-1 supported rotatably on the fixed shaft 61 via the bearing 65 which is on the side of the excitation coil 62-2. The magnet coupling 63 is formed of a permanent magnet rotary body 63-1 supported rotatably on an end portion of the fixed shaft 61 via the bearing 65, and a disc 63-3 having a fan 66 and provided with a conductor or a hysteresis member 63-4 opposed to a permanent magnet 63-2, which is supported rotatably on the fixed shaft 61 via the bearing 65 and fixed to the permanent magnet rotary body, with a narrow clearance left therebetween; and formed so that the permanent magnet rotary body 63-1 and disc 63-3 having the conductor or hysteresis member 63-4 are rotated together or relatively owing to an attraction generated by an eddy current and working between the permanent 63-2 and conductor or hysteresis member 63-4.

When the electromagnetic clutch 62 in the magnet type fan clutch apparatus shown in FIG. 6 is turned on with the clutch rotor 62-1 rotated via the pulley 62-1a, the armature 62-4 held longitudinally movably on the permanent magnet rotary body 63-1 is attracted to the clutch rotor 62-1 owing to the excitation coil 62-2 secured to the fixed shaft 61, so that the clutch rotor 62-1 and permanent magnet rotary body 63-1 are rotated together. When this permanent magnet rotary body 63-1 is rotated, the disc 63-3 is rotated owing to an attraction generated by an eddy current working between the permanent magnet 63-2 of the permanent magnet rotary body 63-1 and the conductor or hysteresis member 63-4 attached to the disc 63-3, to cause the fan 66 to be rotated. During this time, the magnet coupling 63 starts a cushioning action in the same manner as the previously mentioned magnet coupling. Therefore, a load at the time of starting the energization of the electromagnetic clutch 62 is low, and the noise of the fan can be reduced greatly. When the electromagnetic clutch 62 is turned off, the armature 62-4 leaves the clutch rotor 62-1. Consequently, a rotational speed of the disc 63-3 decreases greatly, or the disc stops; and a rotational speed of the fan decreases greatly, or the fan stops.

Namely, in the case of this magnet type fan clutch apparatus, the rotation of the fan 66 can be controlled in the same manner as in the previously mentioned apparatus by turning on and off the electromagnetic clutch 62. Since the turning on and off of the electromagnetic clutch 62 is controlled in accordance with a cooling water temperature, a degree of opening of a throttle, an engine speed and an operation of an air-conditioner switch, the rotation of the fan can be controlled accurately and stably.

Figure 7:
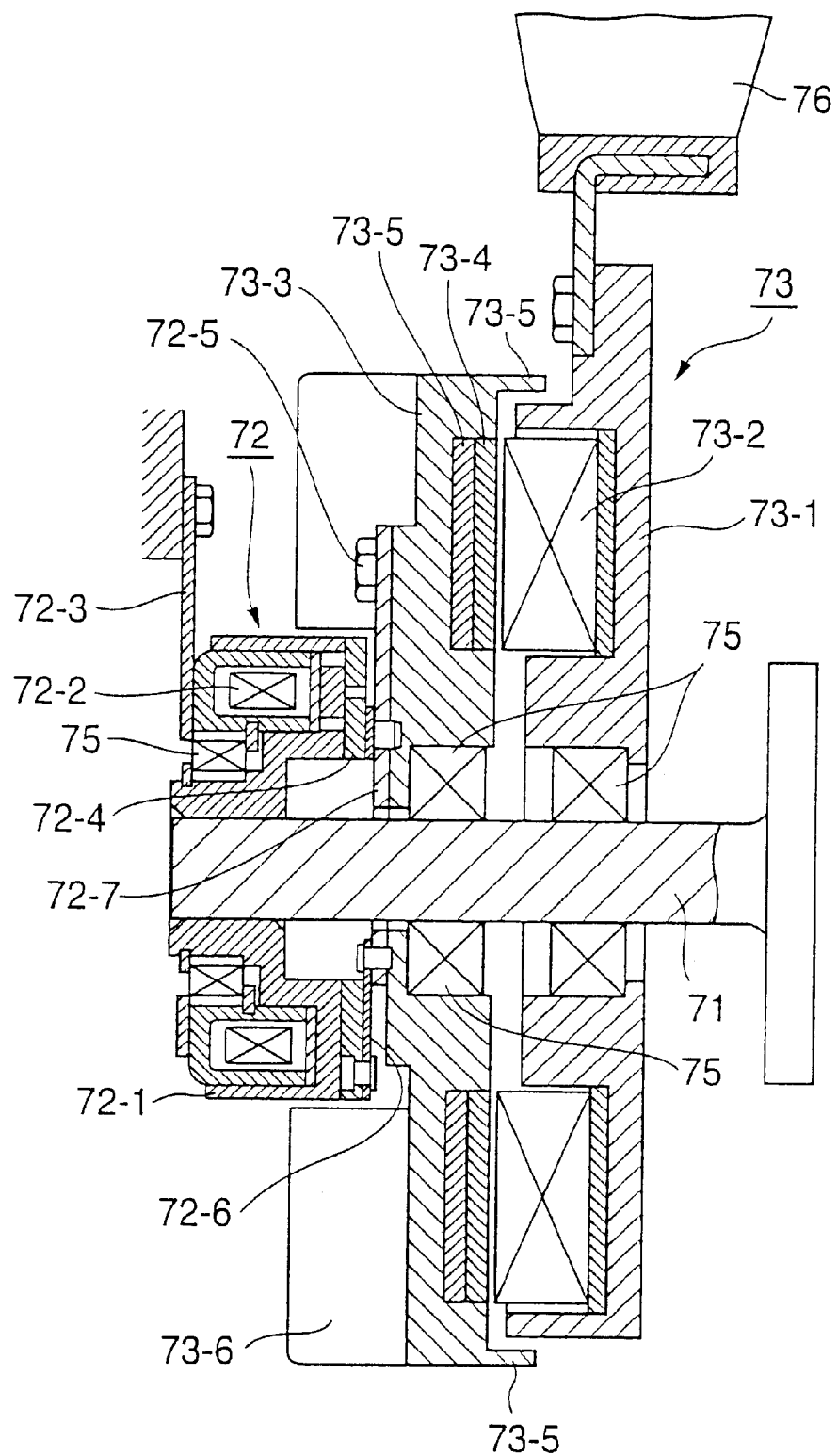
FIG. 7 is a sectioned side elevation showing an embodiment of the magnet type fan clutch apparatuses corresponding to the seventh to ninth present inventions.

The magnet type fan clutch apparatus shown in FIG. 7 has construction identical with that of the apparatus shown in FIG. 1 except that a seal structure is provided on outer circumferential edge portions of a disc and a permanent magnet rotary body. Namely, the clutch apparatus of FIG. 7 is formed of an electromagnetic clutch 72 and a magnet coupling 73 which are mounted on one driving shaft 71. The electromagnetic clutch 72 includes a clutch rotor 72-1 supported on an end portion of and united with the driving shaft 1, an excitation coil 72-2 fitted in the clutch rotor 72-1 via a bearing 75 so as to be mutually rotatable, and fixed to an outer part via a bracket 72-3, and an armature 72-4 held longitudinally movably on the portion of a disc 73-3 supported rotatably on the driving shaft 71 via the bearing 75 which is on the side of the excitation coil 72-2. The armature 72-4 is fixed to the clutch rotor 72-1 via a spring 72-6 attached at one end thereof to a stay 72-7 which is fitted around the driving shaft 1 and fixed at one end thereof to the disc 73-3 by a bolt 72-5.

The magnet coupling 73 is formed by fixing a fan 76 to a permanent magnet rotary body 73-1 supported rotatably via the bearing 75 on the portion of the driving shaft 71 which is on the opposite side of the electromagnetic clutch 72, and securing a conductor 73-4 opposed to a permanent magnet 73-2, which is attached to the permanent magnet rotary body 73-1, with a narrow clearance left therebetween to a disc 73-3 via a core 73-5; and formed so that the permanent magnet rotary body 73-1 and disc 73-3 are rotated together or relatively owing to an attraction generated by an eddy current and working between the permanent magnet 73-2 and conductor 73-4, the disc 73-3 being provided at an outer circumferential edge portion thereof with a projection 73-5 extending over an outer circumferential edge portion of the permanent magnet rotary body 73-1, a seal structure being thereby provided between the outer circumferential edge portions of the disc 73-3 and permanent magnet rotary body 73-1. A reference numeral 73-6 denotes radiation fins.

The above-mentioned seal structure is not limited to the structure shown in FIG. 7, and the structures shown in FIG. 8 to FIG. 23 can also be used.

Figure 8:
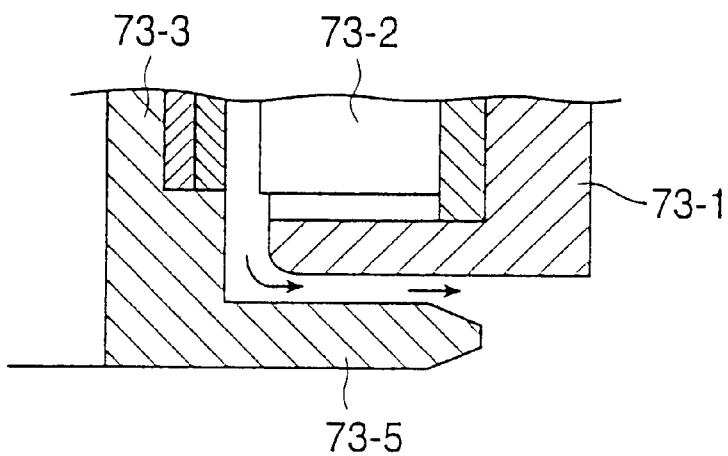
FIG. 8 is an enlarged sectional view of a principal portion of a first example of a seal structure in the same apparatuses.
Figure 9:
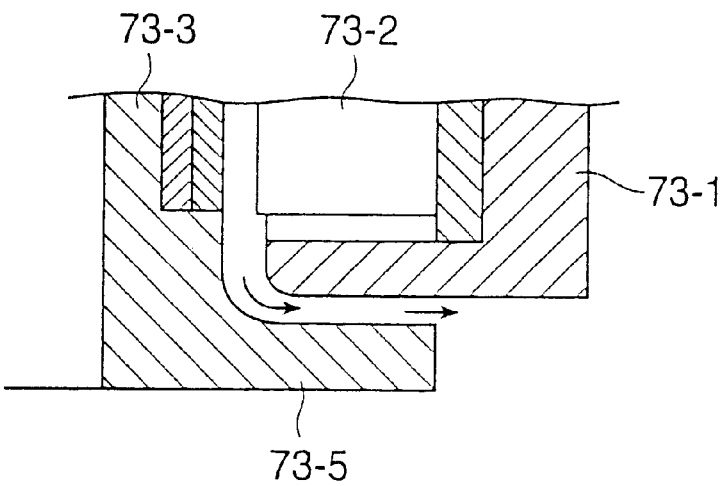
FIG. 9 is an enlarged sectional view of a principal portion of a second example of the seal structure in the same apparatuses.
Figure 10:
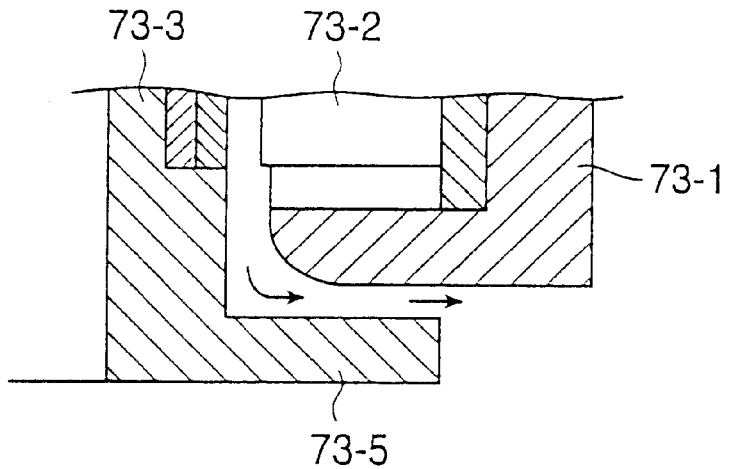
FIG. 10 is an enlarged sectional view of a principal portion of a third example of the seal structure in the same apparatuses.

The seal structures shown in FIG. 8 to FIG. 10 are examples capable of discharging easily the dust (powdered dust, metal powder, etc.) and water, etc. which have entered a narrow clearance between a permanent magnet and a conductor. FIG. 8 shows an example of an outlet portion of a clearance between an outer circumferential edge portion of a disc 73-3 and that of a permanent magnet rotary body 73-1, i.e. an example of a trumpet-shaped seal structure formed by chamfering a circumferential rear surface portion of the permanent magnet rotary body 73-1 and an end portion of an inner surface of a projection 73-5 of a disc 73-3 as shown in the drawing. FIG. 9 shows an example of a labyrinth seal structure made by forming an inner surface of a projection 73-5 of a disc 73-3 arcuately. FIG. 10 shows an example of a seal structure formed by spherically chamfering an angular part of an outer circumferential edge portion of a permanent magnet rotary body 73-1.

In the case of the seal structures shown in FIG. 8 to FIG. 10, it is difficult that dust (powdered dust and metal powder, etc.) and water enter the clearance between the disc 73-3 and permanent rotary body 73-1. Moreover, assuming that dust and water enter the clearance between the disc 73-3 and permanent magnet rotary body 73-1, troubles will not occur. In the case of the seal structure shown in FIG. 8, the dust and water, etc. which have entered the mentioned clearance are easily discharged since the outlet portion of the clearance between the outer circumferential edge portion of the disc 73-3 and that of the permanent magnet rotary body 73-1 is formed in the shape of a trumpet. In the case of the seal structure shown in FIG. 9, the dust and water, etc. which have entered the clearance are easily discharged along an arcuate surface since the inner surface of the projection 73-5 formed on the disc 73-3 has an arcuate shape. In the case of the seal structure shown in FIG. 10, the dust and water, etc. which have entered the clearance are also easily discharged along the spherical surface of the permanent magnet rotary body 73-1.

Figure 11:
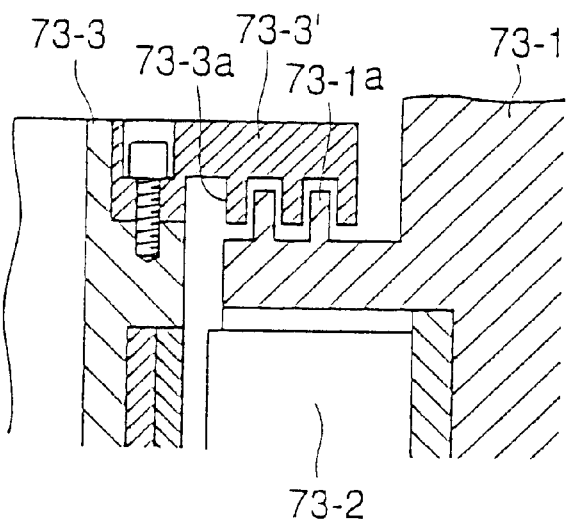
FIG. 11 is an enlarged sectional view of a principal portion of a fourth example of the seal structure in the same apparatuses.
Figure 12:
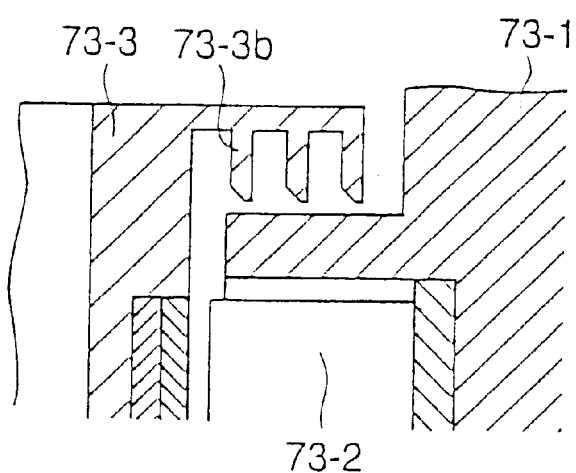
FIG. 12 is an enlarged sectional view of a principal portion of a fifth example of the seal structure in the same apparatuses.
Figure 13:
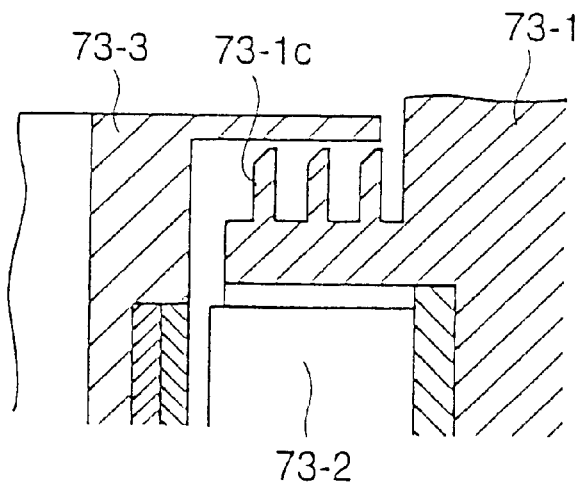
FIG. 13 is an enlarged sectional view of a principal portion of a sixth example of the seal structure in the same apparatuses.
Figure 14:
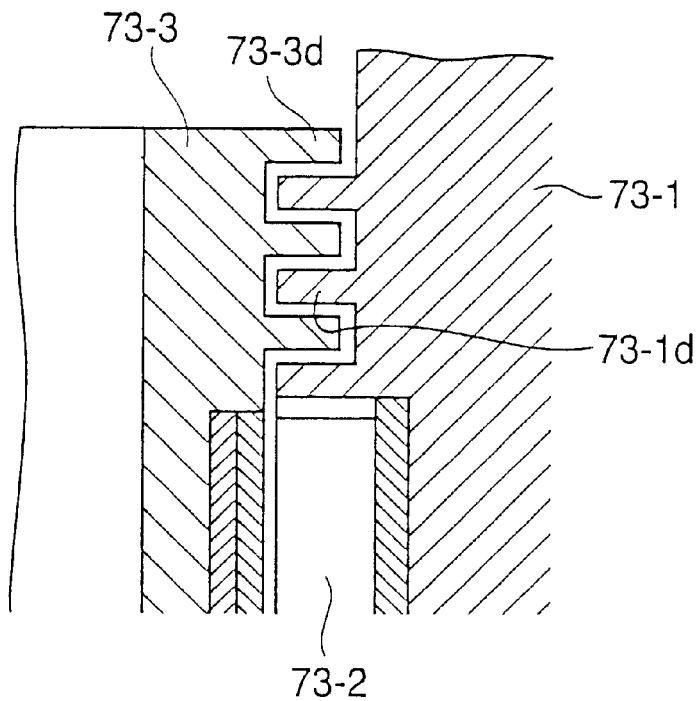
FIG. 14 is an enlarged sectional view of a principal portion of a seventh example of the seal structure in the same apparatuses.
Figure 15:
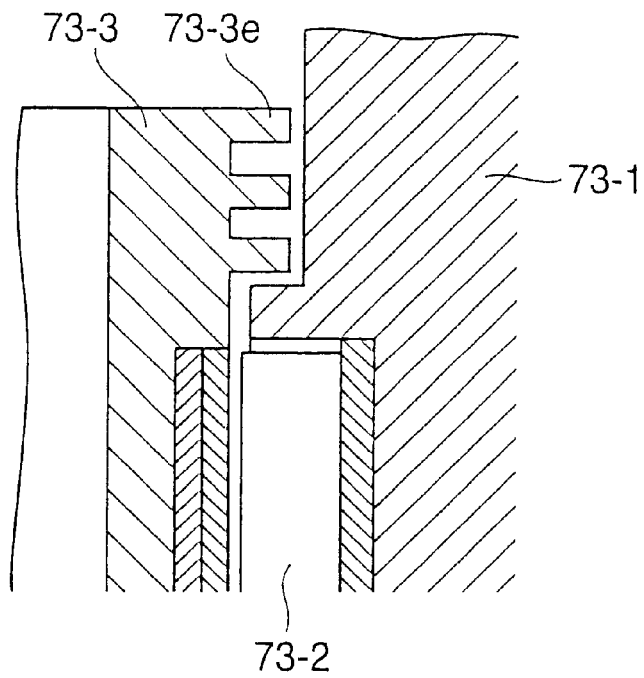
FIG. 15 is an enlarged sectional view of a principal portion of an eighth example of the seal structure in the same apparatuses.

FIG. 11 to FIG. 15 show examples of labyrinth seal structures. FIG. 11 shows a staggered labyrinth seal structure in which cross-sectionally comb-shaped disc type fins 73-3a, 73-1a are provided in a meshed state on a labyrinth ring 73-3' formed on an outer circumferential edge of a disc 73-3 and a permanent rotary body 73-1. FIG. 12 shows a direct passing type labyrinth seal structure in which cross-sectionally comb-shaped disc type fins 73-3b are provided on a disc 73-3. FIG. 13 shows a directly passing type labyrinth seal structure in which cross-sectionally comb-shaped disc type fins 73-1c are provided on a permanent magnet rotary body 73-1. FIG. 14 and FIG. 15 show examples in which labyrinth structures are provided so as to extend in a direction parallel to the axis of a driving shaft. FIG. 14 shows a staggered labyrinth seal structure in which cross-sectionally comb-shaped cylindrically arranged fins 73-3d, 73-1d extending in parallel with the axis of a driving shaft are provided in a meshed state on a disc 73-3 and permanent magnet rotary body 73-1. FIG. 15 shows a directly passing type labyrinth seal structure in which cross-sectionally comb-shaped cylindrically arranged fins 73-3e extending in parallel with the axis of a driving shaft are provided on a disc 73-3.

The cross-sectionally comb-shaped disc type fins 73-3b, 73-1c and cylindrically arranged fins 73-3e can also be provided spirally.

In all of the labyrinth seal structures shown in FIG. 11 to FIG. 15, it is difficult that dust (powdered dust, metal powder, etc.) and water, etc. enter a clearance between the disc 73-3 and permanent magnet rotary body 73-1 owing to the effects of the cross-sectionally comb-shaped disc type fins 73-1a, 73-3a, 73-3b and cylindrically arranged fins 73-3d, 73-1d, 73-3e. Moreover, the labyrinth seal structures shown in FIG. 12, FIG. 13 and FIG. 15 also have an effect in easily discharging the dust and water, etc. which have entered the mentioned clearance.

In a seal structure shown in FIG. 16, a pumping effect is obtained by providing a spiral groove 73-1 in a permanent magnet rotary body 73-1, and the dust in the spiral groove 73-1b is discharged by a wind pressure. The spiral groove 73-1b may also be provided in an inner side of a lap portion of the disc 73-3.

In the seal structures shown in FIGS. 17A, 17B 17C and 17D, a projection 73-5 provided on a disc 73-3 is made of a cylindrical body 73-5a formed separately from the disc. FIG. 17A shows a seal structure formed by fixing a cylindrical body 73-5a of a constant thickness to an outer circumferential edge portion of the disc 73-3. FIG. 17B shows a seal structure formed by reducing the thickness of an opened end portion of a cylindrical body by tapering 73-5a' an inner surface of this opened end portion so that the inner end surface diverges outward. FIG. 17C shows a seal structure formed by outwardly bending an opened end portion of a cylindrical body 73-5a. FIG. 17D shows a seal structure by forming a tapering portion 73-5a', i.e. a thickness reduced portion so that an inner surface of an opened end part of a cylindrical body 73-5a diverges outward, and, furthermore, forming an annular groove 73-1e having a tapering portion 73-1e' in a permanent magnet rotary body 73-1 so that the opened end surface of the cylindrical body 73-5a is positioned within the range of the tapering portion 73-1e' provided on the permanent magnet rotary body 73-1, and so that the water leaving the opened end surface of the cylindrical body 73-5a drops onto the surface of the tapering portion 73-1e' and flows along the annular groove 73-1e.

In the case of these seal structures shown in FIG. 17, it is also difficult that dust (powdered dust, metal powder, etc.) and water, etc. enter a clearance between the disc 73-3 and permanent magnet rotary body 73-1 owing to the effect of the cylindrical body 73-5a, and the seal structures have effects in easily discharging the dust, water, etc. which have entered the clearance.

Figure 18:
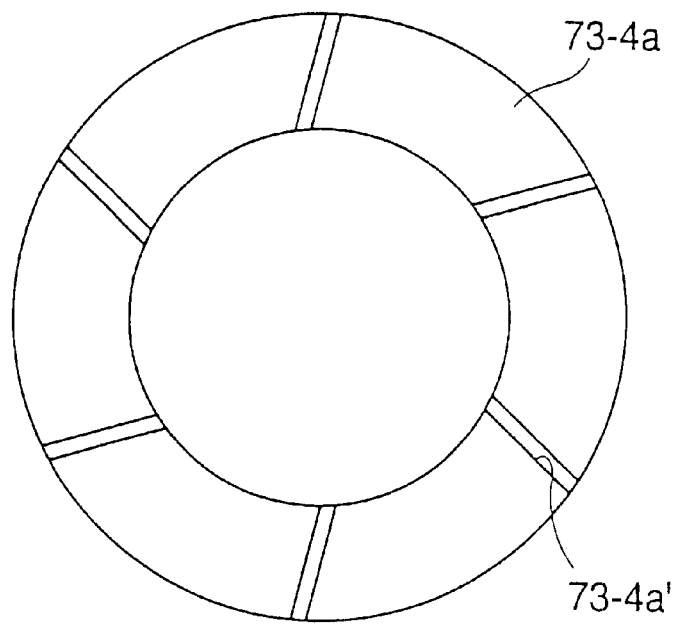
FIG. 18 is a front view showing an example of the conductor of the above-mentioned magnet coupling in the magnet type fan clutch apparatus corresponding to the 11th present invention.
Figure 19:
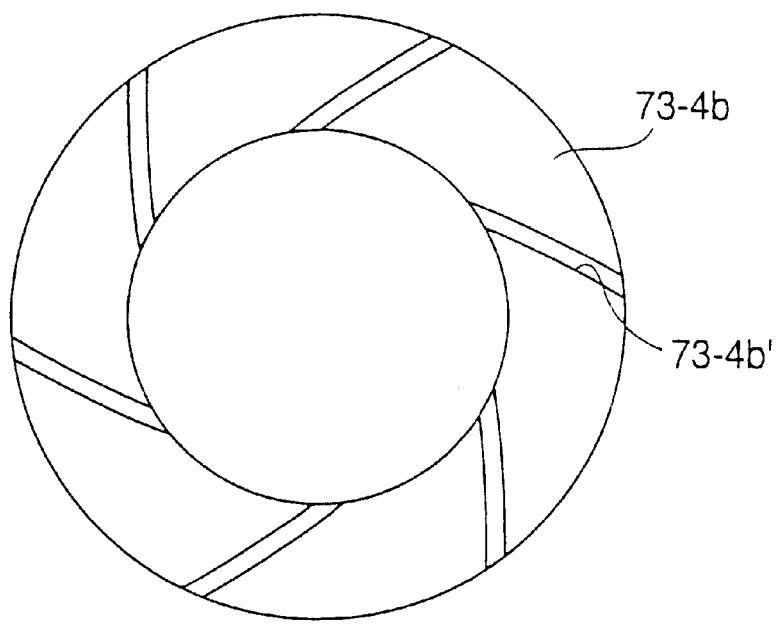
FIG. 19 is a front view showing another example of the conductor of the same magnet coupling.
Figure 20:
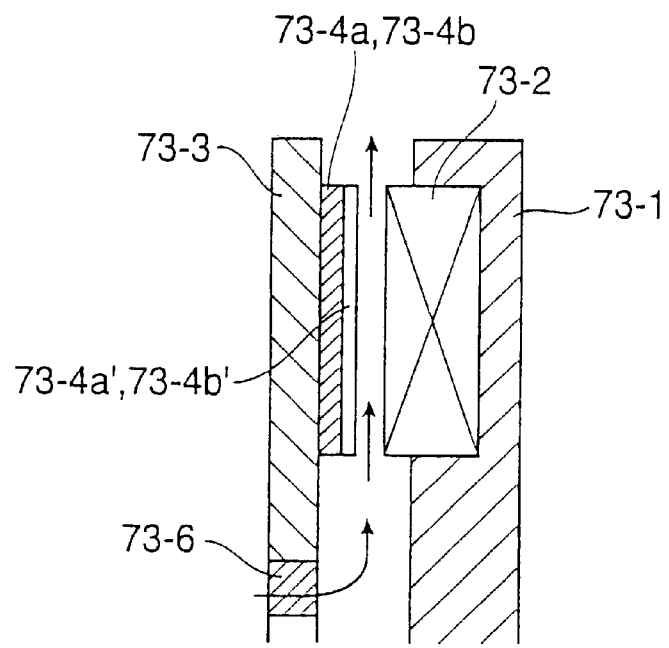
FIG. 20 is a sectioned side elevation of a principal portion of the magnet type fan clutch apparatus using the same conductor.

The conductors 73-4a, 73-4b shown in FIG. 18 and FIG. 19 are provided in the surfaces thereof which are opposed to the relative permanent magnet rotary bodies with guide grooves 73-4a', 73-4b' which are capable of obtaining effect identical with that of guide vanes of a pump. The width, depth and number, etc. of the guide grooves 73-4a', 73-4b' are determined suitably in accordance with the thickness and other sizes of the conductors 73-4, 73-4b. In the case of magnet type fan clutch apparatuses in which conductors 73-4 having these guide grooves 73-4a', 73-4b' are fixed to discs 73-3, a gas flows to the outside as shown by arrows in FIG. 20, owing to the guide grooves 73-4a', 73-4b' which are capable of obtaining effects identical with that of guide vanes of a pump. Accordingly, it is difficult that dust (powdered dust, metal powder, etc.) and water, etc. enter the clearance between the conductors 73-4a, 73-4b and permanent magnets 73-2. Moreover, assuming that dust (powdered dust, metal powder, etc.) and water, etc. enter the clearance between the conductors 73-4a, 73-4b and permanent magnets 73-2, they are discharged to the outside owing to a gas flowing to the outside. At the same time, the conductors 73-4a, 73-4b are cooled with the gas flowing to the outside, so that transmission torque is held down. A reference numeral 73-6 denotes a dust proof filter for the air sucked from the outside.

Figure 21:
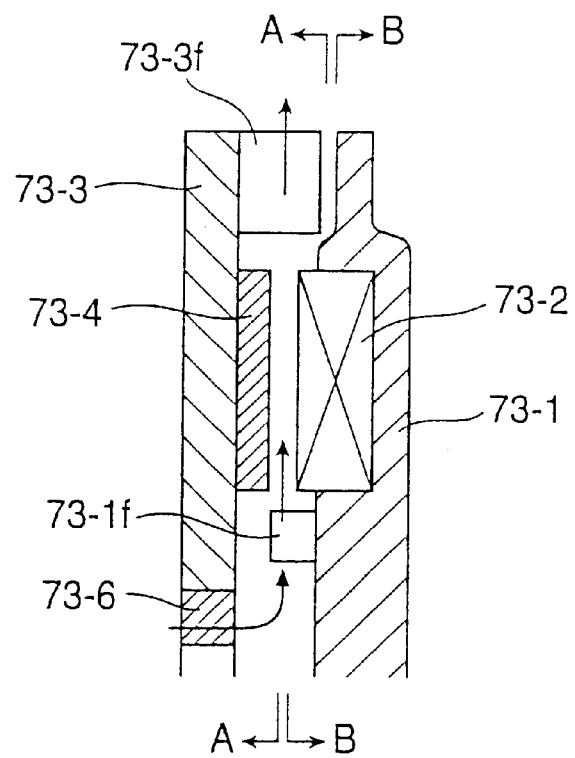
FIG. 21 is a sectioned side elevation of a principal portion of another example of the magnet coupling in the magnet type fan clutch apparatus corresponding to the 12th and 13th present inventions.
Figure 22:
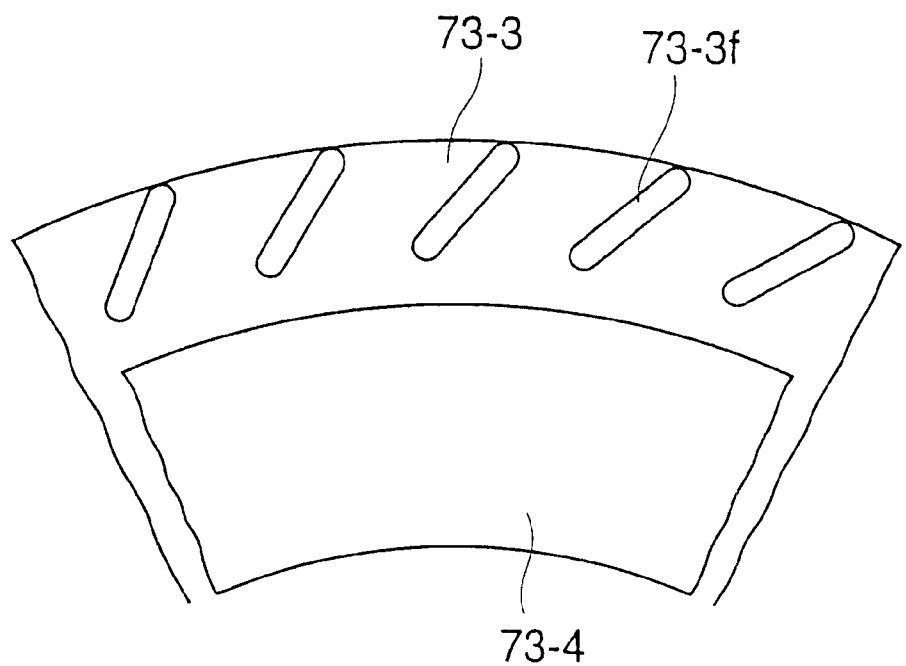
FIG. 22 is a sectional view taken along the line A—A in FIG. 21.
Figure 23:
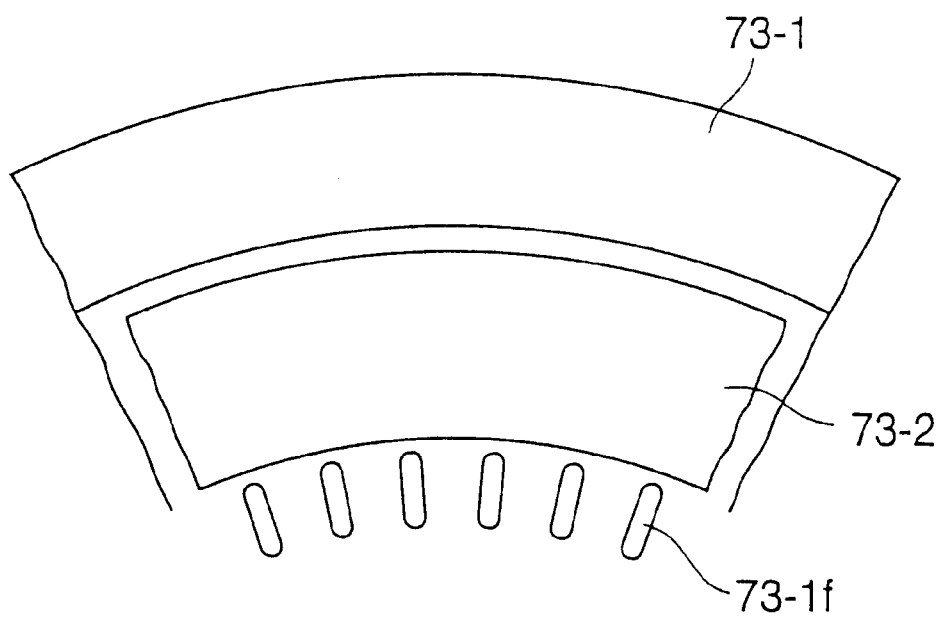
FIG. 23 is a sectional view taken along the line B—B in FIG. 21.

The magnet type fan clutch apparatuses shown in FIG. 21 to FIG. 23 are formed so that the cooling of the conductors and the prevention of the entry of dust, water, etc. into the clearances between the conductors and permanent magnets are attained by fins provided on the conductors of magnet couplings and permanent magnet rotary bodies. Ventilation blades 73-3f are projected from the whole of an outer circumferential end portion of the surface of a disc 73-3 which is opposed to a permanent magnet rotary body, while ventilation vanes 73-1f are projected radially from an inner side portion of the inner surface of the permanent magnet of the permanent magnet rotary body 73-1 which is opposed to the disc. The ventilation blades 73-3f provided on the disc 73-3 can be provided not only incliningly just as the guide vanes of a pump as shown in FIG. 22 but also radially.

In the magnet type fan clutch apparatus thus provided with ventilation blades 73-3f and ventilation vanes 73-1f on the disc 73-3 and permanent magnet rotary body 73-1 respectively, the gas is sucked from the dust proof filter 73-6, and flows toward the outside as shown by arrows in the same manner as in the previously described magnet type fan clutch apparatus owing to the effects of the ventilation blades 73-3f and ventilation vanes 73-1f. Therefore, it is difficult that dust and water, etc. enter a clearance between the conductor 73-4 and permanent magnet 73-2. Moreover, assuming that dust water, etc. enter the clearance between the conductor 73-4 and permanent magnet 73-2, they are discharged to the outside by the gas flowing toward the outside. At the same time the conductor 73-4 is cooled with the gas flowing toward the outside, and the transmission torque is held down.

Figure 24:
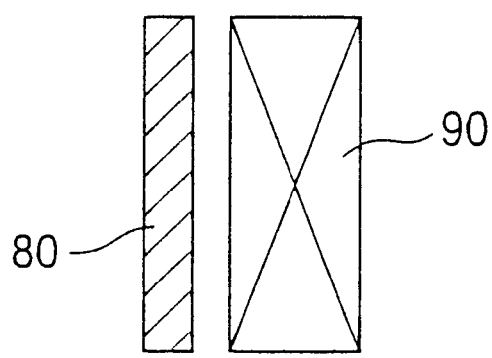
Figure 24:
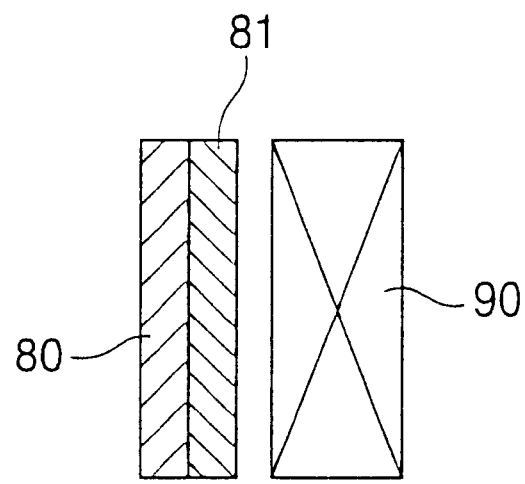
Figure 24:
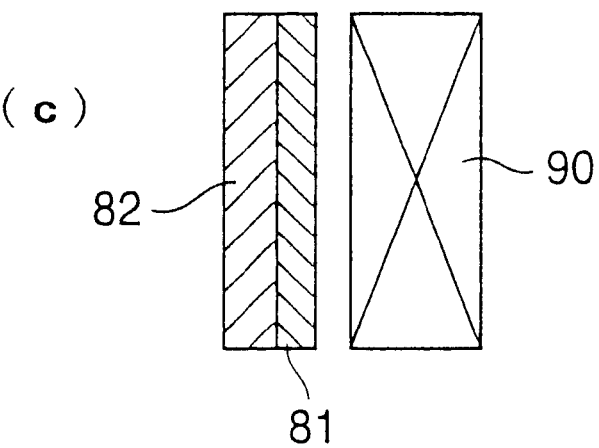

Although, in all of the magnet type fan clutch apparatuses according to the present invention described above, magnet couplings of a combination of a permanent magnet and a conductor or a hysteresis member are shown as examples, an example of a combination of similar parts shown in FIG. 24 may also be employed.

Namely, an example in which a hysteresis member 80 and a permanent magnet 90 are combined with each other as shown in FIG. 24A, an example formed as shown in FIG. 24B, by providing a an eddy current member 81 on a front surface of a hysteresis member 80, and combining the resultant product with a permanent magnet 90, and an example formed as shown in FIG. 24C, by providing a conductor 81 on a front surface of a core member of iron, and combining the resultant product with a permanent magnet 90 can be used.

As described above, the magnet type fan clutch apparatus according to the present invention displays the effects which will be described below.

(1) Since a system for controlling the rotation of the fan by turning on and off an electromagnetic clutch, the occurrence of an accompanied rotation of the fan at the time of starting and accelerating the apparatus can be prevented.

(2) Since the magnet coupling starts a cushioning action, a load at the time of starting of the energization of the electromagnetic clutch is low, and the noise of the fan can be reduced greatly.

(3) Since the electromagnetic clutch is ON/OFF controlled in accordance with a cooling water temperature, an engine speed, an operation of an air-conditioner switch, etc., the rotation of the fan can be controlled accurately and stably.

(4) The simplification of the construction, and the reduction of the dimensions of the apparatus and the reduction of the cost thereof can be attained.

(5) The electromagnetic clutch and magnet coupling have a high reliability and a high safety.

(6) The acceleration performance and fuel consumption can be improved.

(7) Since the entry of the ambient dust (powdered dust metal powder, etc.) and water, etc. into a narrow clearance between the permanent magnet and conductor can be prevented, there is not a fear of the occurrence of functional disorder ascribed to the dust and water, and the function of the magnet type fan clutch is retained.

(8) Since a conductor cooling function is provided, the transmission torque is held down, and transmission torque of a predetermined level is retained at all times.

What is claimed is:

1. A magnet type fan clutch apparatus including an electromagnetic clutch formed of a clutch rotor supported on a driving shaft, an exciting coil provided in the interior of the clutch rotor and supported on an outer part, and an armature held longitudinally movably on the portion of a driven side housing supported rotatably via a bearing on the clutch rotor which is on the side of the exciting coil; and a magnet coupling which has a permanent magnet rotary body, to which a fan is fixed, supported rotatably via a bearing on a driven shaft made integral with the driven side housing, and a disc provided with a conductor opposed to the permanent magnet rotary body with a narrow clearance left therebetween, and mounted on the driven shaft, and which is formed so that the permanent magnet rotary body and disc are rotated together owing to an attraction working between the permanent magnet and the conductor, the magnet coupling being ON/OFF controlled by the electromagnetic clutch.

2. A magnet type fan clutch apparatus according to claim 1, wherein a seal structure is provided between the circumferential portion of the disc which is on the outer side of the conductor and the circumferential portion of the permanent magnet rotary body which is on the outer side of the permanent magnet.

3. A magnet type fan clutch apparatus according to claim 2, wherein the seal structure is a labyrinth seal type structure.

4. A magnet type fan clutch apparatus according to claim 3, wherein the labyrinth seal type structure is a spiral seal type structure.

5. A magnet type fan clutch apparatus according to claim 1, wherein a ventilation mechanism is provided between the disc and permanent magnet rotary body.

6. A magnet type fan clutch apparatus according to claim 5, wherein a ventilation mechanism made by forming guide grooves, which are capable of obtaining an effect identical with that of guide vanes of a pump, is provided in opposed surfaces of the conductor on the disc and the permanent magnet rotary body.

7. A magnet type fan clutch apparatus according to claim 5, wherein ventilation blades are provided on an outer circumferential end portion of surface of the disc which is opposed to the permanent magnet rotary body, and ventilation vanes on an inner side of the conductor, so that the blades and vanes project radially.

8. A magnet type fan clutch apparatus according to claim 5, wherein ventilation vanes are projected radially from the inner side of the permanent magnet of the permanent magnet rotary body which is opposed to the disc, and ventilation blades on an outer circumferential side of the permanent magnet, in such a manner that the vanes and blades extend radially.

9. A magnet type fan clutch apparatus according to claim 1, wherein a combination of the permanent magnet of the coupling and the conductor is formed of an eddy current member provided on a front surface of an iron plate and the permanent magnet.

* * * * *